US012492300B2

(12) United States Patent
Lagarde et al.

(10) Patent No.: US 12,492,300 B2
(45) Date of Patent: Dec. 9, 2025

(54) RUBBER COMPOSITION

(71) Applicant: COMPAGNIE GENERALE DES ETABLISSEMENTS MICHELIN, Clermont-Ferrand (FR)

(72) Inventors: Patricia Lagarde, Clermont-Ferrand (FR); Aline Riou, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 871 days.

(21) Appl. No.: 17/629,601

(22) PCT Filed: Jul. 21, 2020

(86) PCT No.: PCT/FR2020/051312
§ 371 (c)(1),
(2) Date: Jan. 24, 2022

(87) PCT Pub. No.: WO2021/019150
PCT Pub. Date: Feb. 4, 2021

(65) Prior Publication Data
US 2022/0282070 A1    Sep. 8, 2022

(30) Foreign Application Priority Data
Jul. 26, 2019   (FR) .................................... 1908496

(51) Int. Cl.
| C08L 7/02 | (2006.01) |
| B60C 1/00 | (2006.01) |
| C08J 3/22 | (2006.01) |
| C08K 3/04 | (2006.01) |
| C08K 3/06 | (2006.01) |
| C08K 3/36 | (2006.01) |
| C08K 5/01 | (2006.01) |
| C08K 5/098 | (2006.01) |

(52) U.S. Cl.
CPC .................. *C08L 7/02* (2013.01); *B60C 1/00* (2013.01); *C08J 3/22* (2013.01); *C08K 3/04* (2013.01); *C08K 3/06* (2013.01); *C08K 3/36* (2013.01); *C08K 5/01* (2013.01); *C08K 5/098* (2013.01); *B60C 2001/0066* (2013.01); *C08K 2201/006* (2013.01)

(58) Field of Classification Search
CPC . C08K 5/098; C08K 3/04; C08K 5/01; C08K 3/36; C08L 7/00–02; C08L 9/00; C08L 9/10; C08L 11/00–02
See application file for complete search history.

(56) References Cited

U.S. PATENT DOCUMENTS

| 4,719,266 A | * | 1/1988 | Craig ....................... C08K 3/11 525/346 |
| 5,977,238 A | | 11/1999 | Labauze |
| 6,013,718 A | | 1/2000 | Cabioch et al. |
| 6,048,923 A | * | 4/2000 | Mabry .................. B29B 7/7495 524/496 |
| 6,503,973 B2 | | 1/2003 | Robert et al. |
| 6,815,473 B2 | | 11/2004 | Robert et al. |
| 6,929,783 B2 | | 8/2005 | Chung et al. |
| 7,111,742 B1 | | 9/2006 | Zimmermann |
| 7,250,463 B2 | | 7/2007 | Durel et al. |
| 7,312,264 B2 | | 12/2007 | Gandon-Pain |
| 8,344,063 B2 | | 1/2013 | Marechal et al. |
| 8,455,584 B2 | | 6/2013 | Robert et al. |
| 8,492,479 B2 | | 7/2013 | Robert et al. |
| 9,670,291 B2 | | 6/2017 | Marechal et al. |
| 9,670,332 B2 | | 6/2017 | Thomasson |
| 10,059,833 B2 | | 8/2018 | Sevignon et al. |
| 10,519,299 B2 | | 12/2019 | Sevignon et al. |
| 2001/0036991 A1 | | 11/2001 | Robert et al. |
| 2002/0183436 A1 | | 12/2002 | Robert et al. |
| 2005/0004297 A1 | | 1/2005 | Durel et al. |
| 2006/0089445 A1 | | 4/2006 | Gandon-Pain |
| 2008/0110552 A1 | * | 5/2008 | Arnold .................. B60C 1/0016 524/847 |

(Continued)

FOREIGN PATENT DOCUMENTS

| EP | 1127909 A1 | 8/2001 |
| FR | 2740778 A1 | 5/1997 |

(Continued)

OTHER PUBLICATIONS

Partial machine translation of WO 2012/084821 A1 (Year: 2012).*
International Search Report dated Oct. 9, 2020, in corresponding PCT/FR2020/051312 (4 pages).
S. Brunauer, et al., "Adsorption of Gases in Multimolecular Layers", J. Am. Chem. Soc., vol. 60, pp. 309-319 (1938).

(Continued)

*Primary Examiner* — Kregg T Brooks
(74) *Attorney, Agent, or Firm* — VENABLE LLP

(57) ABSTRACT

A rubber composition is based on at least one elastomeric matrix comprising at least one diene elastomer, at least one reinforcing filler predominantly comprising carbon black and at least one reinforcing inorganic filler, at least one plasticizing resin having a glass transition temperature of greater than or equal to 20° C., at least one cobalt salt and at least one sulfur vulcanization system, the rubber composition exhibiting a Z score for dispersion of the reinforcing filler in the elastomeric matrix of greater than or equal to 85. A reinforced product comprises at least one steel reinforcing element coated at least in part with a metallic coating and the rubber composition, the reinforcing element being embedded in the rubber composition. A tire comprises this composition and/or this reinforced product

10 Claims, 1 Drawing Sheet

(56) References Cited

U.S. PATENT DOCUMENTS

| | | |
|---|---|---|
| 2010/0184912 A1 | 7/2010 | Marechal et al. |
| 2010/0249270 A1 | 9/2010 | Robert et al. |
| 2010/0252156 A1 | 10/2010 | Robert et al. |
| 2012/0252928 A1 | 10/2012 | Marechal et al. |
| 2013/0303687 A1 | 11/2013 | Thomasson |
| 2014/0256846 A1 | 9/2014 | Sevignon et al. |
| 2015/0259516 A1* | 9/2015 | Mathey .............. C08L 7/00 523/156 |
| 2016/0311257 A1* | 10/2016 | Miyazaki ............. C08L 7/00 |
| 2018/0273732 A1 | 9/2018 | Sevignon et al. |

FOREIGN PATENT DOCUMENTS

| | | |
|---|---|---|
| FR | 2765882 A1 | 1/1999 |
| WO | 01/92402 A1 | 12/2001 |
| WO | 03/016387 A1 | 2/2003 |
| WO | 03/018215 A1 | 3/2003 |
| WO | 2004/096865 A2 | 11/2004 |
| WO | 2008/141702 A1 | 11/2008 |
| WO | 2009/000750 A1 | 12/2008 |
| WO | 2009/000752 A1 | 12/2008 |
| WO | 2011/042507 A1 | 4/2011 |
| WO | 2012/080111 A1 | 6/2012 |
| WO | WO-2012084821 A1 * | 6/2012 ............ B60C 1/00 |
| WO | 2013/060857 A1 | 5/2013 |
| WO | 2016/096559 A1 | 6/2016 |

OTHER PUBLICATIONS

R. Mildenberg, et al., Hydrocarbon Resins, VCH, New York, chapter 5, pp. 141-146 (1997).

\* cited by examiner

[Fig 1]
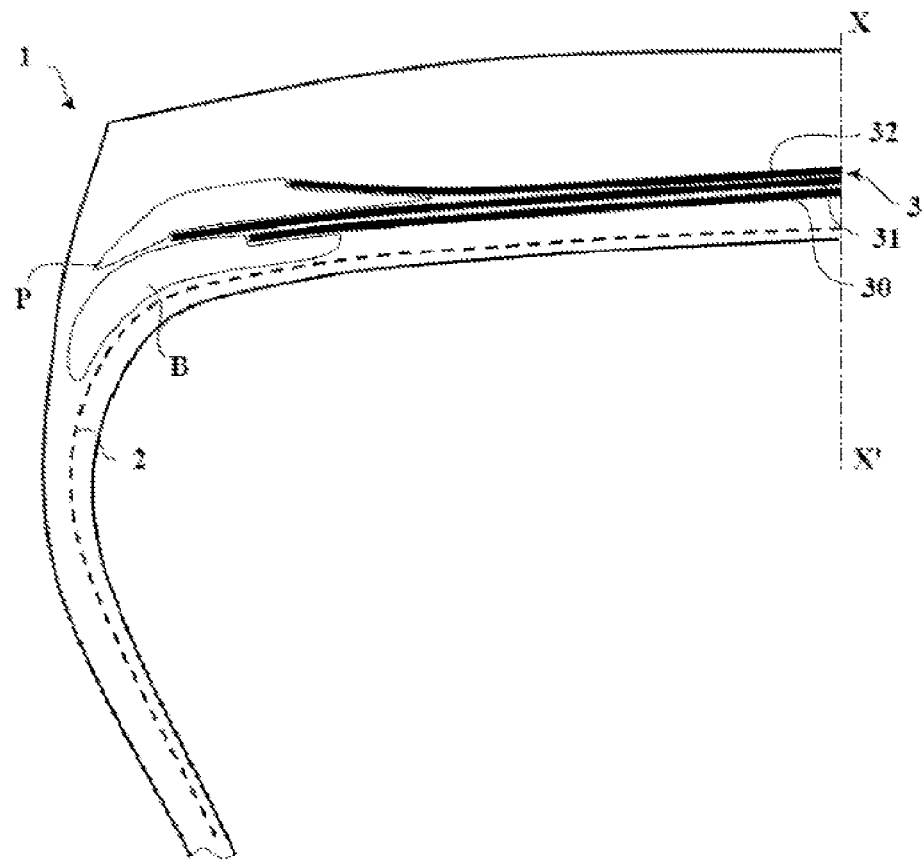
[Fig 2]
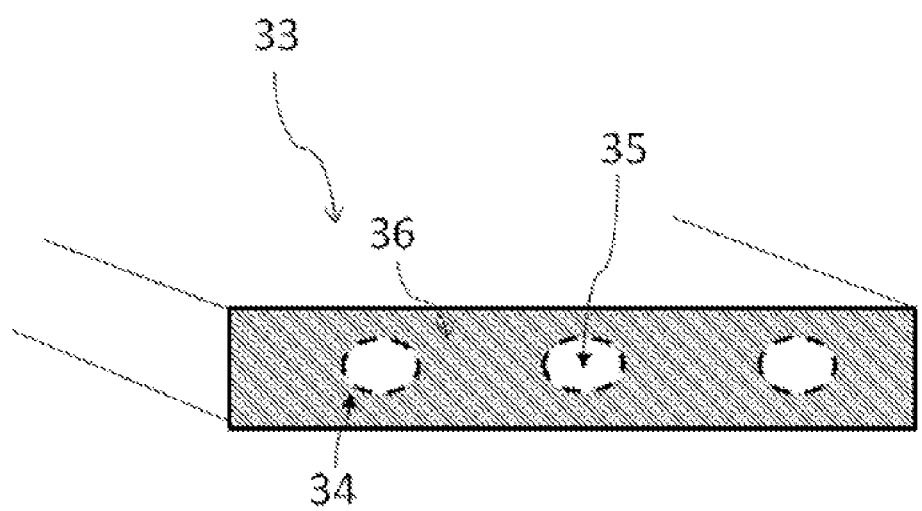

RUBBER COMPOSITION

BACKGROUND

The field of the present invention is that of rubber compositions based on diene elastomers, on reinforcing fillers and on organic cobalt salts; these rubber compositions being in particular intended for the manufacture of reinforced products and for the manufacture of tyres.

Rubber compositions based on diene elastomers, on carbon black and on organic cobalt salts are generally used in rubber articles, such as tyres, conveyor belts or transmission belts, because they exhibit a good adhesiveness to the metal elements present in these articles. In tyres, these rubber compositions are used in particular in the constitution of various internal layers, such as reinforced plies, and can also be referred to as coating composition.

In particular, it is known that the various reinforced plies constituting in particular the belt of radial tyres comprise metal reinforcers in the form of steel cords made up of fine threads assembled together by braiding or twisting; these metal reinforcers being covered at the surface with brass.

In order to effectively fulfil their function of reinforcing the belts of radial tyres, which are subjected, as is known, to very high stresses during running of the tyres, these steel cords must satisfy a very large number of sometimes contradictory technical criteria, such as high compressive endurance, high tensile strength, high wear resistance, high corrosion resistance and strong adhesion to the surrounding rubber, and be capable of maintaining these performance qualities at a very high level for as long as possible. It is easily understood that the adhesive interphase between rubber and metal plays a dominating role in the persistence of these performance qualities.

The adhesion between the rubber composition and the metal reinforcing elements is created via the phenomenon of sulfurization of the metallic, in particular brass-coated, surface of the cord. However, the rubber composition, just like the bonds created, can change under the effect of humidity, temperature or corrosive elements and their combined effects, for example the combined effect of oxidation and of heat (thermo-oxidation) encountered in tyres. Ultimately, these effects can result in the appearance of cracks in these rubber compositions which can lead to the separation of the various plies constituting the belt of the tyre. It is thus important for the rubber composition of the reinforced products to exhibit good resistance to cracking and to exhibit good adhesion to the steel reinforcement element.

Furthermore, this rubber composition should also exhibit good cohesion while having the lowest possible hysteresis in order to obtain a reduction in the rolling resistance.

Rubber compositions which meet the criteria listed above are known from the state of the art. These compositions comprise a diene elastomer, in particular natural rubber, carbon black, an organic cobalt salt and a vulcanization system comprising sulfur, zinc oxide, stearic acid and vulcanization accelerators.

However, tyre designers are constantly looking for solutions which make it possible to change the existing compromise in properties of these coating compositions by improving at least one property without penalizing the others.

In particular, nowadays, in view of the fact that fuel savings and the need to preserve the environment have become a priority, it is desirable to produce rubber compositions having a hysteresis which is as low as possible.

Numerous solutions have already been experimented with in order to achieve the objective of a fall in hysteresis. In particular, mention may be made of reducing the amount of reinforcing fillers in the rubber compositions. However, this reduction in the content of reinforcing fillers is accompanied by a deterioration in the cohesion of the rubber compositions.

In the light of the above, there thus still exists a need to provide rubber compositions, in particular for reinforced products, which satisfy a compromise in complex and acceptable properties, in particular for use in tyres.

This is why one aim of the present invention is to provide a rubber composition, in particular for a reinforced product, exhibiting an improved resistance to cracking while having acceptable hysteresis properties and without its adhesion and cohesion properties being degraded.

On continuing its research studies, the Applicant has discovered that the addition of a reinforcing inorganic filler and of a plasticizing resin to a rubber composition based on a diene elastomer, on carbon black and on cobalt salt exhibiting good dispersion of the reinforcing filler in its elastomeric matrix makes it possible, surprisingly, to significantly improve the resistance to cracking and the cohesion of this rubber composition without degrading its adhesion properties and its hysteresis.

SUMMARY

Thus, a subject-matter of the present invention relates to a rubber composition, in particular for a reinforced product, based on at least one elastomeric matrix comprising at least one diene elastomer, at least one reinforcing filler predominantly comprising carbon black and at least one reinforcing inorganic filler, at least one plasticizing resin having a glass transition temperature of greater than or equal to 20° C., at least one cobalt salt and at least one vulcanization system, said rubber composition exhibiting a Z score for dispersion of the reinforcing filler in the elastomeric matrix of greater than or equal to 85, preferably of greater than or equal to 90.

Another subject-matter of the present invention relates to a reinforced product comprising at least one steel reinforcing element coated at least in part with a metallic coating and a rubber composition as defined above, said reinforcing element being embedded in said rubber composition.

Another subject-matter of the present invention relates to a tyre comprising at least one rubber composition as defined above or comprising at least at least one reinforced product as defined above.

DETAILED DESCRIPTION

In the present description, unless expressly indicated otherwise, all the percentages (%) shown are % by weight.

The abbreviation "phr" means parts by weight per hundred parts of elastomer or rubber (of the total of the elastomers, if several elastomers are present). It should be noted that, in the concept of phr: "parts by weight per hundred parts of elastomer", the combination of all of the elastomers present in the final composition is taken into consideration.

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

When reference is made to a "predominant" compound, this is understood to mean, within the meaning of the present invention, that this compound is predominant among the compounds of the same type in the composition, that is to say that it is that which represents the greatest amount by weight among the compounds of the same type. Thus, for example, a predominant polymer is the polymer representing the greatest weight with respect to the total weight of the polymers in the composition. In the same way, a "predominant" filler is that representing the greatest weight among the fillers of the composition. By way of example, in a system comprising just one polymer, the latter is predominant within the meaning of the present invention and, in a system comprising two polymers, the predominant polymer represents more than half of the weight of the polymers. On the contrary, a "minor" compound is a compound which does not represent the greatest fraction by weight among the compounds of the same type. The words "predominantly" and "predominant" are synonymous and equivalent. The word "minor" and the phrase "to a minor extent" are synonymous and equivalent.

The carbon-comprising compounds mentioned in the description can be of fossil or biobased origin. In the latter case, they can partially or completely result from biomass or be obtained from renewable starting materials resulting from biomass. Polymers, plasticizers, fillers, and the like, are concerned in particular.

As seen above, the rubber composition of the present invention, in particular for a reinforced product, is based on at least one elastomeric matrix comprising at least one diene elastomer, at least one reinforcing filler predominantly comprising carbon black and at least one reinforcing inorganic filler, at least one cobalt salt, at least one plasticizing resin having a glass transition temperature of greater than or equal to 20° C. and at least one vulcanization system, said rubber composition exhibiting a Z score for dispersion of the reinforcing filler in the elastomeric matrix of greater than or equal to 85, preferably of greater than or equal to 90.

The rubber composition of the invention comprises at least one elastomeric matrix comprising at least one diene elastomer.

Within the meaning of the present invention, the term "elastomeric matrix" is intended to mean all of the elastomers (rubbers) of the rubber composition. Thus, the elastomeric matrix can in particular consist of a single elastomer but also of a blend of two or more elastomers.

The term "diene elastomer" (or, without distinction, "diene rubber"), whether natural or synthetic, should be understood, in a known way, as meaning an elastomer consisting, at least in part (i.e., a homopolymer or a copolymer), of diene monomer units (monomers carrying two conjugated or non-conjugated carbon-carbon double bonds).

Diene elastomers can be classified in two categories: "essentially unsaturated" or "essentially saturated". The term "essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15 mol %, of units of diene origin). In the category of "essentially unsaturated" diene elastomers, the term "highly unsaturated" diene elastomer is understood to mean in particular a diene elastomer having a content of units of diene origin (conjugated dienes) which is greater than 50 mol %.

The term "diene elastomer capable of being used in the context of the present invention" is understood more particularly to mean:
  any homopolymer of a conjugated or non-conjugated diene monomer having from 4 to 12 carbon atoms;
  any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as in particular 1,3-butadiene or 2-methyl-1,3-butadiene (or isoprene).

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

More particularly, the diene elastomer is:
  any homopolymer of a conjugated diene monomer, in particular any homopolymer obtained by polymerization of a conjugated diene monomer having from 4 to 12 carbon atoms;
  any copolymer obtained by copolymerization of one or more conjugated dienes with one another or with one or more vinylaromatic compounds having from 8 to 20 carbon atoms;
  any copolymer obtained by copolymerization of one or more conjugated or non-conjugated dienes with ethylene, an a-monoolefin or their mixture, such as, for example, the elastomers obtained from ethylene, from propylene with a non-conjugated diene monomer of the abovementioned type.

The diene elastomer which can be used in the context of the present invention can thus be a natural rubber or a synthetic diene elastomer.

The synthetic diene elastomers can have any microstructure, which depends on the polymerization conditions used, in particular on the presence or absence of a modifying and/or randomizing agent and on the amounts of modifying and/or randomizing agent employed.

These elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or amino functional groups, such as aminobenzophenone, for example; mention may be made, for example, for coupling to a reinforcing inorganic filler, such as silica, of silanol functional groups or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or also polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type. These functionalized elastomers can be used as a blend with one another or with non-functionalized elastomers. For example, it is possible to use a silanol- or polysiloxane-functionalized elastomer having a silanol end, as a mixture with an elastomer coupled and/or star-branched with tin (described in WO 11/042507), the latter representing a content of 5% to 50%, for example of 25% to 50%.

Suitable as diene elastomers which can be used in the context of the present invention are polybutadienes and in particular those having a content (mol %) of 1,2-units of between 4% and 80% or those having a content (mol%) of cis-1,4-units of greater than 80%, polyisoprenes, butadiene/styrene copolymers and in particular those having a Tg (glass transition temperature (Tg, measured according to ASTM D3418-1999) of between 0° C. and −90° C. and more particularly between −10° C. and −70° C., a styrene content of between 1% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −50° C. In the case of butadiene/styrene/isoprene copolymers, suitable in particular are those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C.

Preferentially, the diene elastomer or elastomers which can be used in the context of the present invention are preferentially selected from the group consisting of polybutadienes (abbreviated to (BRs)), synthetic polyisoprenes (IRs), natural rubber (NR), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these polymers.

More preferentially still, the diene elastomer or elastomers which can be used in the context of the present invention are preferentially selected from the group consisting of natural rubber, synthetic polyisoprenes and the mixtures of these elastomers.

The composition according to the invention comprises at least one reinforcing filler predominantly comprising carbon black and at least one reinforcing inorganic filler. The reinforcing filler is thus a blend of a carbon black and of a reinforcing inorganic filler in which the carbon black is predominant and the reinforcing inorganic filler is minor.

Reinforcing fillers are known for their abilities to reinforce a rubber composition which can be used in the manufacture of tyres.

The term "a reinforcing filler composed predominantly of carbon black" or "carbon black is predominant" is understood to mean, within the meaning of the present invention, that the carbon black represents the greatest amount by weight of the reinforcing fillers of the rubber composition. In other words, the weight of the carbon black is strictly greater than 50% of the total weight, preferentially greater than 60% of the total weight, of the reinforcing fillers in the rubber composition.

All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 or N772 blacks. These carbon blacks can be used in the isolated state, as commercially available, or in any other form, for example as support for some of the rubber additives used.

Preferably, the carbon black exhibits a compressed oil absorption number (COAN) of greater than or equal to 60 ml/100 g, preferably a COAN number within a range extending from 65 to 130 ml/100 g. The COAN (Compressed Oil Absorption Number) of carbon blacks is measured according to Standard ASTM D3493-2016.

Preferably, the carbon black exhibits a BET specific surface of greater than or equal to 30 $m^2/g$; preferably of greater than or equal to 60 $m^2/g$, more preferentially still within a range extending from 60 to 150 $m^2/g$. The BET specific surface of the carbon black is measured according to Standard D6556-2010 [multipoint (a minimum of 5 points) method — gas: nitrogen — relative pressure P/PO range: 0.1 to 0.3].

More preferentially still, the carbon black exhibits a compressed oil absorption number (COAN) within a range extending from 65 to 130 ml/100 g and a BET specific surface within a range extending from 60 to 150 $m^2/g$.

The content of carbon black can be within a range extending from 10 to 80 phr. Below 10 phr, it has been observed that the stiffness of the rubber composition begins to be no longer sufficient, negatively impacting the endurance, whereas, above 80 phr, the rolling resistance performance qualities begin to deteriorate. Advantageously, the content of carbon black is within a range extending from 30 to 70 phr and more preferentially still from 35 to 65 phr.

The rubber composition of the invention comprises, as reinforcing filler, in addition to the carbon black, at least one reinforcing inorganic filler. This reinforcing inorganic filler is minor with respect to the carbon black, that is to say that it does not represent the greatest fraction by weight among the reinforcing fillers. In other words, the weight of the reinforcing inorganic filler is strictly less than 50% of the total weight, preferentially less than 40% of the total weight, of the reinforcing fillers in the rubber composition.

The term "reinforcing inorganic filler" should be understood here as meaning any inorganic or mineral filler, whatever its colour and its origin (natural or synthetic), also referred to as "white" filler, "clear" filler or even "non-black" filler, in contrast to carbon black, capable of reinforcing, by itself alone, without means other than an intermediate coupling agent, a rubber composition intended for the manufacture of tyres. In a known way, some reinforcing inorganic fillers can be characterized in particular by the presence of hydroxyl (—OH) groups at their surface.

Mineral fillers of the siliceous type, preferentially silica ($-SiO_2$), or of the aluminous type, especially alumina ($Al_2O_3$), are suitable in particular as reinforcing inorganic fillers.

Preferentially, the reinforcing inorganic filler comprises a silica. More preferentially still, the reinforcing inorganic filler is composed, in particular essentially, of silica.

The silica used can be any reinforcing silica known to a person skilled in the art, in particular any precipitated or fumed silica exhibiting a BET specific surface and a CTAB specific surface both of less than 450 $m^2/g$, preferably within a range extending from 30 to 400 $m^2/g$, in particular from 60 to 300 $m^2/g$.

In the present account, the BET specific surface of the reinforcing inorganic filler is determined by gas adsorption using the Brunauer-Emmett-Teller method described in "The Journal of the American Chemical Society" (Vol. 60, page 309, February 1938), and more specifically according to a method adapted from Standard NF ISO 5794-1, Appendix E, of June 2010 [multipoint (5 point) volumetric method—gas: nitrogen—degassing under vacuum: one hour at 160° C.—relative pressure p/po range: 0.05 to 0.17].

For the reinforcing inorganic fillers, such as silica, for example, the CTAB specific surface values were determined according to Standard NF ISO 5794-1, Appendix G, of June 2010. The process is based on the adsorption of CTAB (N-hexadecyl-N,N,N-trimethylammonium bromide) on the "external" surface of the reinforcing filler.

Any type of precipitated silica, in particular highly dispersible precipitated silicas (referred to as "HDS" for "highly dispersible" or "highly dispersible silica"), can be used. These precipitated silicas, which are or are not highly dispersible, are well known to a person skilled in the art. Mention may be made, for example, of the silicas described in Applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silica, of the following commercial silicas: the Ultrasil® VN2GR and Ultrasil® VN3GR silicas from Evonik, the Zeosil® 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

The physical state in which the reinforcing inorganic filler is provided is not important, whether it is in the form of a powder, of microbeads, of granules, or else of beads or any other appropriate densified form. Of course, reinforcing inorganic filler is also understood to mean mixtures of different reinforcing inorganic fillers, in particular mixtures of silicas as described above.

A person skilled in the art will understand that, as replacement for the reinforcing inorganic filler described above, use might be made of a reinforcing filler of another nature, provided that this reinforcing filler of another nature is covered with an inorganic layer, such as silica, or else comprises functional sites, in particular hydroxyl sites, at its surface which require the use of a coupling agent in order to establish the bond between this reinforcing filler and the diene elastomer. By way of example, mention may be made of carbon blacks partially or completely covered with silica, or of carbon blacks modified by silica, such as, without limitation, the fillers of Ecoblack® type of the CRX2000 series or of the CRX4000 series from Cabot Corporation.

In order to couple the reinforcing inorganic filler to the diene elastomer, use may be made, in a well-known way, of an at least bifunctional coupling agent (or bonding agent) intended to provide a satisfactory connection, of chemical and/or physical nature, between the inorganic filler (surface of its particles) and the diene elastomer. In a known way, the content of agent for coupling the reinforcing inorganic filler to the diene elastomer can preferentially represent from 0.5% to 15% by weight, with respect to the amount of reinforcing inorganic filler.

Use is made in particular, as agent for coupling the reinforcing inorganic filler to the diene elastomer, of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being capable of interacting with the hydroxyl groups of an inorganic filler, and a second functional group comprising a sulfur atom, said second functional group being capable of interacting with the diene elastomer.

Preferentially, the organosilanes are selected from the group consisting of organosilane polysulfides (symmetrical or asymmetrical), such as bis(3-triethoxysilylpropyl) tetrasulfide, abbreviated to TESPT, sold under the name Si69 by Evonik, or bis(3-triethoxysilylpropyl) disulfide, abbreviated to TESPD, sold under the name Si75 by Evonik, polyorganosiloxanes, mercaptosilanes, blocked mercaptosilanes, such as S-(3-(triethoxysilyl)propyl) octanethioate, sold by Momentive under the name NXT Silane. More preferentially, the organosilane is an organosilane polysulfide.

The content of reinforcing inorganic filler of the rubber composition can be less than or equal to 50 phr, preferably is within a range extending from 0.5 phr to 50 phr. Below 0.5 phr, it has been observed that the adhesion of the rubber composition begins to be no longer sufficient, whereas, above 50 phr, the rolling resistance performance qualities begin to deteriorate. Advantageously, this content is within a range extending from 2 to 40 phr, more preferentially still from 4 to 25 phr.

Preferentially, the content of total reinforcing filler (carbon black and reinforcing inorganic filler) is within a range extending from 20 to 130 phr, more preferentially is within a range extending from 30 to 120 phr, more preferentially still within a range extending from 30 to 95 phr.

According to a preferred embodiment of the invention, the content of carbon black is within a range extending from 30 to 70 phr and the content of the reinforcing inorganic filler is within a range extending from 2 to 40 phr.

According to a preferred embodiment of the invention, the content of carbon black is within a range extending from 30 to 70 phr and the content of the reinforcing inorganic filler is within a range extending from 4 to 25 phr.

According to another preferred embodiment of the invention, the content of carbon black is within a range extending from 35 to 65 phr and the content of the reinforcing inorganic filler is within a range extending from 2 to 40 phr.

According to another embodiment of the invention, the content of carbon black is within a range extending from 35 to 65 phr and the content of the reinforcing inorganic filler is within a range extending from 4 to 25 phr.

As seen above, the rubber composition of the invention comprises a plasticizing resin having a glass transition temperature (Tg) greater than or equal to 20° C., also referred to as high Tg plasticizing resin. The Tg is measured according to Standard ASTM D3418 (1999).

A high Tg hydrocarbon resin is, by definition, a solid, at ambient temperature and pressure (20° C., 1 atm).

Plasticizing resins, also referred to as plasticizing hydrocarbon resins, are polymers well known to a person skilled in the art which can be used in particular as plasticizing agents or tackifying agents in polymeric matrices. They are essentially based on carbon and hydrogen but can comprise other types of atoms, for example oxygen. They are by nature at least partially miscible (i.e. compatible) at the contents used with the polymer compositions for which they are intended, so as to act as true diluents. They have been described, for example, in the work entitled "Hydrocarbon Resins" by R. Mildenberg, M. Zander and G. Collin (New York, VCH, 1997, ISBN 3-527-28617-9), Chapter 5 of which is devoted to their applications, in particular in the tyre rubber field (5.5. "Rubber Tires and Mechanical Goods"). In a known way, these hydrocarbon resins can also be described as thermoplastic resins in the sense that they soften when heated and can thus be moulded.

Preferably, the high Tg plasticizing resin exhibits a softening temperature less than or equal to 170° C., more preferentially less than or equal to 140° C. The softening point of the hydrocarbon resins is measured according to Standard ISO 4625-2004 ("Ring and Ball" method).

The high Tg plasticizing resins can be aliphatic or aromatic or else of the aliphatic/aromatic type, that is to say based on aliphatic and/or aromatic monomers, and the mixtures of these resins. They can be natural or synthetic, based or not based on petroleum (if such is the case, also known under the name of petroleum resins).

Suitable as aromatic monomers are, for example: styrene, a-methylstyrene, indene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ cut (or more generally from a $C_8$ to $C_{10}$ cut). Preferably, the vinylaromatic monomer is styrene or a vinylaromatic monomer resulting from a $C_9$ cut (or more generally from a $C_8$ to $C_{10}$ cut). Preferably, the vinylaromatic monomer is the minor monomer, expressed as molar fraction, in the copolymer under consideration.

According to a particularly preferential embodiment, the high Tg plasticizing resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ cut homopolymer or copolymer resins, $C_9$ cut homopolymer or copolymer resins, α-methylstyrene homopolymer and copolymer resins and the mixtures of these resins.

The term "terpene" groups together here, in a known way, α-pinene, β-pinene and limonene monomers; the limonene monomer exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Mention will in particular be made, among the above plasticizing hydrocarbon resins, of α-pinene, β-pinene, dipentene or polylimonene homo- or copolymer resins.

More preferentially still, the high Tg plasticizing resin is selected from the group consisting of cyclopentadiene or dicyclopentadiene homopolymer or copolymer resins, $C_5$ cut homopolymer or copolymer resins (in particular $C_5$ cut/vinylaromatic copolymer resins), $C_9$ cut homopolymer or copolymer resins and the mixtures of these resins.

More preferentially still, the high Tg plasticizing resin is a $C_5$ cut/vinylaromatic copolymer resin.

Preferably, the high Tg plasticizing resin exhibits at least any one of the following characteristics:
  a glass transition temperature of greater than or equal to 30° C.;
  a number-average molecular weight (Mn) of between 300 and 2000 g/mol, more preferentially between 400 and 1500 g/mol;
  a polydispersity index (PI) of less than 3, more preferentially of less than 2 (as a reminder: PI=Mw/Mn with Mw the weight-average molecular weight).

More preferentially, this high Tg plasticizing resin exhibits all of the preferential characteristics above.

The macrostructure (Mw, Mn and PI) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The preferential high Tg plasticizing resins above are well known to a person skilled in the art and are commercially available, for example sold as regards:
  polylimonene resins: by DRT under the name Dercolyte L120 (Mn=625 g/mol; Mw=1010 g/mol; PI=1.6; Tg=72° C.) or by Arizona under the name Sylvagum TR7125C (Mn=630 g/mol; Mw=950 g/mol; PI=1.5; Tg=70° C.);
  $C_5$ cut/vinylaromatic, in particular $C_5$ cut/styrene, or $C_5$ cut/$C_9$ cut copolymer resins: by Neville Chemical Company under the names Super Nevtac 78, Super Nevtac 85 or Super Nevtac 99, by Goodyear Chemicals under the name Wingtack Extra, by Kolon under the names Hikorez T1095 and Hikorez T1100 or by Exxon under the names Escorez 2101 and Escorez 1273;
  limonene/styrene copolymer resins: by DRT under the name Dercolyte TS 105 from DRT or by Arizona Chemical Company under the names ZT115LT and ZT5100.

Mention may also be made, as examples of other preferential plasticizing resins, of phenol-modified α-methylstyrene resins. It should be remembered that a number referred to as "hydroxyl number" (measured according to Standard ISO 4326 and expressed in mg KOH/g) is used in a known way in order to characterize these phenol-modified resins. α-Methylstyrene resins, in particular those which are phenol-modified, are well known to a person skilled in the art and are commercially available, for example sold by Arizona Chemical under the names Sylvares SA 100 (Mn=660 g/mol; PI=1.5; Tg=53° C.); Sylvares SA 120 (Mn=1030 g/mol; PI=1.9; Tg=64° C.); Sylvares 540 (Mn=620 g/mol; PI=1.3; Tg=36° C.; hydroxyl number=56 mg KOH/g); and Sylvares 600 (Mn=850 g/mol; PI=1.4; Tg=50° C.; hydroxyl number=31 mg KOH/g).

The content of high Tg plasticizing resin in the rubber composition can be within a range extending from 0.5 to 20 phr, preferably from 2 to 12 phr, more preferentially still from 3 to 10 phr.

The rubber composition also comprises a cobalt salt, preferably an organic cobalt salt.

The content of the cobalt salt can, for example, be within a range extending from 0.1 phr to 6 phr, preferably extending from 0.5 phr to 5 phr, more preferentially still extending from 0.6 phr to 3 phr.

Preferably, the cobalt salt is selected from the group consisting of cobalt abietates, cobalt acetylacetonates, cobalt tallates, cobalt naphthenates, cobalt resinates and the mixtures of these cobalt salts.

The vulcanization system of the rubber composition used in the context of the present invention is based on sulfur (or on a sulfur-donating agent).

The sulfur can be used at a preferential content which is less than or equal to 10 phr, preferably within a range extending from 0.5 to 7 phr, more preferentially is within a range extending from 0.75 phr to 5.5 phr. Below 0.5 phr, the rubber composition might not be sufficiently vulcanized for its use, in particular in a reinforced product, whereas, above 10 phr, the composition might exhibit a reduced resistance to thermo-oxidation.

Additional to this base vulcanization system can be various known vulcanization accelerators or activators, such as described below, incorporated during the first non-productive phase and/or during the productive phase, as are described subsequently.

Mention may be made, as vulcanization activators which can be used in the context of the invention, for example, of zinc oxide, stearic acid or equivalent compounds, such as stearic acid salts, and salts of transition metals, guanidine derivatives (in particular diphenylguanidine), or also known vulcanization retarders.

In particular, use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to "MBTS"), N-cyclohexyl-2-benzothiazolesulfenamide ("CBS"), N,N-dicyclohexyl-2-benzothiazolesulfenamide ("DCBS"), N-(tert-butyl)-2-benzothiazolesulfenamide ("TBBS"), N-(tert-butyl)-2-benzothiazolesulfenimide ("TBSI"), tetrabenzylthiuram disulfide ("TBZTD"), zinc dibenzyldithiocarbamate ("ZBEC") and the mixtures of these compounds.

The rubber composition according to the invention can optionally also comprise all or a portion of the normal additives generally used in rubber compositions intended in particular for the manufacture of tyres, such as, for example, pigments, protective agents, such as antiozone waxes, chemical antiozonants, antioxidants, plasticizing oils, reinforcing resins, anti-reversion agents (for example hexamethylene 1,6-bis(thiosulfate) salts or 1,3-bis(citraconimidomethyl)benzene), or methylene acceptors (for example novolak phenolic resin) or donors (for example HMT or H3M).

The rubber compositions according to the invention can also additionally comprise a second inorganic salt other than the cobalt salt. Preferentially, this inorganic salt other than the cobalt salt is selected from the group consisting of the salts of an alkaline earth metal, the salts of an alkali metal, lanthanide salts and the mixtures of these inorganic salts. More preferentially still, this inorganic salt other than the cobalt salt is selected from the group consisting of an acetylacetonate of an alkaline earth metal, an acetylacetonate of an alkali metal and an acetylacetonate of a lanthanide metal.

The rubber composition of the invention exhibits a Z score for dispersion of the reinforcing filler in the elastomeric matrix of the composition of greater than or equal to 85, preferably of greater than or equal to 90.

There exist numerous methods for making available a rubber composition exhibiting good dispersion of the reinforcing filler in the elastomeric matrix.

In general, in order for a reinforcing filler to be well dispersed in the elastomeric matrix of the rubber composition, it is advisable for this reinforcing filler to be present in the elastomeric matrix of the composition in a final form which is both as finely divided as possible and as homogeneously distributed as possible.

Mention may be made, in order to obtain a rubber composition exhibiting good dispersion of the reinforcing filler, for example, of the techniques for bulk compounding the various constituents of the rubber composition.

Another solution for obtaining such a rubber composition exhibiting good dispersion of the reinforcing filler consists in using a masterbatch of diene elastomer and of carbon black. The term "masterbatch" is understood to mean a composite based on diene elastomer into which a filler and optionally other additives have been introduced.

Preferentially, the rubber composition used in the context of the present invention is obtained from a masterbatch comprising at least the diene elastomer and the carbon black into which the minor reinforcing inorganic filler, the high Tg plasticizing resin, the cobalt salt and the other possible constituents of the rubber composition, with the exception of the vulcanization system, are subsequently incorporated, in particular in an internal mixer, this mixture being thermomechanically kneaded until a maximum temperature within a range extending from 130° C. to 200° C. is achieved. Once this mixture has cooled to a temperature of less than 100° C., the vulcanization system is subsequently incorporated and kneading is carried out up to a maximum temperature of less than 100° C.

More preferentially still, said masterbatch is obtained by liquid-phase compounding starting from an aqueous dispersion of carbon black, that is to say a filler dispersed in water, commonly referred to as "slurry", and from a diene elastomer latex. The diene elastomer latex is a specific form of the diene elastomer which exists in the form of diene elastomer particles dispersed in water.

Thus, in order to obtain the rubber composition which can be used in the context of the present invention, use will thus preferentially be made of diene elastomer latices, the diene elastomers being those defined above.

Reference can be made, as natural rubber (NR) latex which is particularly suitable for the invention, to Chapter 3, "Latex Concentrates: Properties and Composition", by K. F. Gaseley, A. D. T. Gordon and T. D. Pendle in "Natural Rubber Science and Technology", A. D. Roberts, Oxford University Press—1988.

More particularly, several forms of natural rubber latex are sold: the natural rubber latices referred to as "field latices", the natural rubber latices referred to as "concentrated natural rubber latices", epoxidized latices ("ENR"s), deproteinized latices or also prevulcanized latices. The natural rubber field latex is a latex to which ammonia has been added in order to prevent premature coagulation and the concentrated natural rubber latex corresponds to a field latex which has undergone a treatment corresponding to a washing, followed by a concentration. The various categories of concentrated natural rubber latices are listed in particular according to Standard ASTM D 1076-06. Singled out in particular among these concentrated natural rubber latices are concentrated natural rubber latices of the grade referred to as: "HA" (high ammonia) and of the grade referred to as "LA" (low ammonia); for the invention, use will advantageously be made of concentrated natural rubber latices of HA grade.

The natural rubber latex can be used directly or be diluted beforehand in water in order to facilitate the use thereof.

Thus, as synthetic diene elastomer latex, the latex can in particular consist of a synthetic diene elastomer already available in the form of an emulsion (for example, a polybutadiene or a copolymer of butadiene and of styrene, SBR, prepared in emulsion) or consist of a synthetic diene elastomer initially in solution (for example, an SBR or a BR prepared in solution) which is emulsified in a mixture of organic solvent and of water, generally by means of a surface-active agent.

A latex of SBR, in particular an SBR prepared in emulsion ("ESBR") or an SBR prepared in solution ("SSBR"), and more particularly an SBR prepared in emulsion, is particularly suitable in the context of the present invention.

There are two main types of processes for the emulsion copolymerization of styrene and butadiene, one of them, or hot process (carried out at a temperature close to 50° C.), being suitable for the preparation of highly branched SBRs, whereas the other, or cold process (carried out at a temperature which can range from 15° C. to 40° C.), makes it possible to obtain more linear SBRs.

In the case of an SBR (ESBR or SSBR) elastomer, use is made in particular of an SBR having a moderate styrene content, for example of between 20% and 35% by weight, or a high styrene content, for example between 35% and 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

It should be noted that it is possible to envisage using one or more natural rubber latices as a blend, one or more synthetic rubber latices as a blend, or a blend of one or more natural rubber latices with one or more synthetic rubber latices.

Preferentially, the diene elastomer masterbatch is obtained according to the following process stages:
  feeding a continuous stream of a diene elastomer latex to a mixing region of a coagulation reactor defining an elongated coagulation region extending between the mixing region and an outlet,
  feeding a continuous stream of a fluid comprising the aqueous dispersion of carbon black under pressure to the mixing region of a coagulation reactor in order to form a coagulated mixture (also referred to as coagulum),
  drying the coagulum obtained above in order to recover the first masterbatch.

The stages of this process, as well as the coagulation reactor, are described in detail in the document U.S. Pat. No. 6,929,783B2, in particular in columns 16 to 18. The process, in particular as described in this document, makes it possible to obtain a masterbatch of diene elastomer and of carbon black exhibiting very good dispersion of the carbon black in the diene elastomer. This process consists in particular in incorporating a continuous stream of a first fluid composed of a diene elastomer latex in the compounding region of a coagulation reactor, in incorporating a second continuous stream of a second fluid composed of an aqueous dispersion of carbon black under pressure in the compounding region, in order to form a mixture with the elastomer latex, the compounding of these two fluids being sufficiently energetic to make it possible to virtually completely coagulate the elastomer latex with the carbon black before the outlet orifice of the coagulation reactor, and in then drying the coagulum obtained in order to obtain the masterbatch.

Once the masterbatch of diene elastomer and of carbon black has been obtained, the minor reinforcing inorganic filler, the high Tg plasticizing resin, the cobalt salt and the other possible constituents of the rubber composition, with the exception of the vulcanization system, are incorporated therein, in particular in an internal mixer, and a first phase of thermo-mechanical kneading or working is carried out up to a maximum temperature within a range extending from 130° C. to 200° C. This first stage of mixing in the internal mixer is described as "non-productive" phase. The total duration of the kneading, in this non-productive phase, is preferably within a range extending from 1 to 15 min.

After cooling the mixture thus obtained during this first non-productive phase, the vulcanization system is then incorporated at low temperature, generally in an external mixer, such as an open mill. This is the phase, often described as "productive", which takes place for a few minutes, for example between 2 and 15 min, and at a temperature typically of less than 120° C., preferably within a range extending from 60° C. to 100° C.

The final rubber composition thus obtained is subsequently calendered, for example in the form of a sheet or of a plaque, in particular for a laboratory characterization, or also calendered or extruded in the form of a rubber sheet or layer which can be used in the manufacture of a reinforced product according to the invention as described below or in the manufacture of an internal layer in a tyre.

The crosslinking (or curing) is carried out in a known way at a temperature generally of between 130° C. and 200° C., for a sufficient time which can vary, for example, between 5 and 90 min, as a function in particular of the curing temperature, of the crosslinking system adopted and of the kinetics of crosslinking of the composition under consideration.

Preferably, the rubber composition can be used in the tyre in the form of a layer, in particular in the form of an internal layer. The term "layer" is understood to mean any three-dimensional element, of any shape and thickness, in particular as a sheet, band or other element of any cross section, for example rectangular or triangular.

Another subject-matter of the present invention relates to a reinforced product comprising at least one steel reinforcing element coated at least in part with a metallic coating and a rubber composition as defined above, said reinforcing element being embedded in said rubber composition.

The term "steel reinforcing element" is understood to mean an element composed predominantly (that is to say, for more than 50% of its weight) or entirely (for 100% of its weight) of steel making possible the mechanical reinforcement of a rubber composition in which this reinforcing element is intended to be embedded.

The steel reinforcing element can comprise, in one embodiment, a single threadlike reinforcing element, also referred to as individual monofilament, the core of which is made of steel.

The term "threadlike reinforcing element" is understood to mean a slender element of great length relative to its cross section, whatever the shape of the latter, for example circular, elliptical, oblong, polygonal, in particular rectangular, square or oval. In the case of a rectangular section, the threadlike element exhibits the shape of a band. When it is circular in shape, the diameter of the threadlike reinforcing element is preferably less than 5 mm, more preferentially within a range extending from 0.05 to 2 mm.

The steel threadlike reinforcing element can be rectilinear as well as non-rectilinear, for example twisted or corrugated. The threadlike reinforcing element can also be in the form of strips or bands which exhibit a great length with respect to their thickness.

The steel threadlike reinforcing element can exhibit a mechanical strength ranging from 1000 MPa to 5000 MPa. Such mechanical strengths correspond to the grades of steel commonly encountered in the tyre field, namely the NT (Normal Tensile), HT (High Tensile), ST (Super Tensile), SHT (Super High Tensile), UT (Ultra Tensile), UHT (Ultra High Tensile) and MT (Mega Tensile) grades, the use of high mechanical strengths optionally making possible an improved reinforcement of the rubber composition in which the reinforcing element is intended to be embedded and a lightening of the rubber composition thus reinforced.

In another embodiment, the steel reinforcing element can comprise an assembly of several individual steel monofilaments (or several steel threadlike reinforcing elements) as are described above, assembled together in a helix, for example by braiding or twisting the individual steel monofilaments, in order to form, for example, layered cords comprising several concentric layers of individual steel monofilaments or strand cords, each strand comprising several concentric layers of individual steel monofilaments.

The steel core of the reinforcing element is monolithic, that is to say that it is, for example, made as one piece or moulded.

The steel can have a pearlitic, ferritic, austenitic, bainitic or martensitic microstructure or a microstructure resulting from a mixture of these microstructures.

Preferably, the steel is a pearlitic carbon steel denoted, in a known way, as "carbon steel". In particular, when a carbon steel is used, its carbon content is preferably within a range extending from 0.1% to 1.2% by weight and more preferentially from 0.3% to 1.1% by weight, with respect to the weight of steel.

It is also possible to use a steel called "stainless steel", this steel comprising at least 0.5% by weight, preferably at least 5% by weight and more preferentially at least 15% by weight of chromium, with respect to the weight of steel.

The term "steel reinforcing element partially coated with a metallic coating" is understood to mean that the steel threadlike reinforcing element is directly covered, at least over a part of the steel core, with a metallic coating. The metallic coating promotes the adhesion of the reinforcing element to the rubber composition in which it is embedded. Preferentially, the metallic coating covers the whole of the steel core of the reinforcing element. This metallic coating can be made of a metal identical to or different from steel; preferably, the metal of the coating is different from steel.

Preferentially, the metallic coating comprises a metal chosen from zinc, copper, tin, cobalt and the alloys of these metals. Mention will be made, as examples of alloys of these metals, of brass and bronze. Preferably, the metallic coating is an alloy of metals, more preferentially is made of brass.

The term "directly covered" is understood to mean that the metallic coating is in contact with the reinforcing element without any other object, in particular another layer or another coating, being interposed between the reinforcing element and the metallic coating.

The coating of the steel reinforcing element is carried out by any technique well known to a person skilled in the art, in particular by any known coating technique, such as, for example, spraying, impregnation by dipping, forward progression in a bath or other equivalent technique for the deposition of a thin or ultra-thin film or composition, or also by a combination of one or more of these techniques.

The reinforced product according to the invention can be prepared according to a process comprising at least the following stages:
  producing two layers of the rubber composition according to the invention and as described above;
  combining at least a portion of at least one steel reinforcing element coated at least in part with a metallic coating with the rubber composition of the preceding stage to form a reinforced product;
  crosslinking by curing, preferably under pressure, the reinforced product thus formed.

The combination of the steel reinforcing element coated at least in part with a metallic coating with the rubber composition can be carried out, for example, by sandwiching the reinforcing element(s) in the two layers of the rubber composition according to the invention by depositing it(them) between the two layers.

Alternatively, the reinforced product can be manufactured by depositing the steel reinforcing element coated at least in part with a metallic coating on a portion of a layer obtained in the preceding stage, the layer is then folded back over itself to cover said reinforcing element, which is then thus sandwiched over its entire length or a part of its length.

The reinforced product of the invention can advantageously be used in the reinforcement of tyres. Among these tyres, the invention relates in particular to tyres intended to equip motor vehicles of passenger type, SUVs (Sport Utility Vehicles), two-wheel vehicles (in particular bicycles and motorcycles), aircraft, and industrial vehicles chosen from vans, heavy-duty vehicles, that is to say underground trains, buses, heavy road transport vehicles (lorries, tractors, trailers) or off-road vehicles, such as heavy agricultural vehicles or earthmoving equipment, and other transportation and handling vehicles. Equally, the reinforced product of the invention can be used in the manufacture of rubber belts or also for transport belts, such as conveyor belts.

As already indicated above, the reinforced product of the invention can be provided in varied forms, in a unitary form (with a single reinforcing element) or else in the form of a rubber ply, layer, band, strip or block in which several steel reinforcing elements coated at least in part with a metallic coating are incorporated, for example by calendering. The definitive adhesion between the steel reinforcing element coated at least in part with a metallic coating and the rubber composition according to the invention described above can be obtained at the end of the curing, preferably under pressure, of the finished article for which the reinforced product of the invention is intended.

Preferably, the reinforced product is a straight reinforced ply or an angled reinforced ply.

In one embodiment, in which each reinforcing element is a threadlike reinforcing element, the threadlike reinforcing elements are arranged parallel to one another and are embedded, for example by calendering, in the rubber composition described above. A ply known as a straight ply, in which the threadlike reinforcing elements of the ply are parallel to one another and are parallel to a main direction of the ply, is obtained. Then, if necessary, portions of each straight ply are cut out along a cutting angle and these portions are butted against one another so as to obtain a ply known as an angled ply, in which the threadlike reinforcing elements of the ply are parallel to one another and form an angle with the main direction of the angled ply, the angle formed with the main direction then being equal to the cutting angle.

The reinforced product can be a carcass ply, a working crown ply, a hooping crown ply, a protective crown ply, and the like.

The invention also relates to a tyre comprising at least one rubber composition according to the invention as defined above and/or at least one reinforced product as defined above.

It is possible to define, within the tyre, three types of regions:
- the exterior region in contact with the ambient air, this region being essentially composed of the tread and of an external sidewall of the tyre; this external sidewall is an elastomeric layer positioned outside the carcass reinforcement with respect to the internal cavity of the tyre, between the crown and the bead, so as to completely or partially cover the region of the carcass reinforcement extending from the crown to the bead;
- the interior region in contact with the inflation gas when the tyre is fitted onto a rim, this region being generally composed of a layer airtight to the inflation gases, sometimes known as interior airtight layer or inner liner;
- the internal region of the tyre, that is to say that between the exterior region and the interior region. This region includes layers or plies which are referred to here as internal layers of the tyre. These are, for example, carcass plies, tread underlayers, tyre belt plies or any other layer which is not in contact with the ambient air or the inflation gas of the tyre.

The rubber composition according to the invention, as defined above, is particularly well suited to internal layers, in particular to reinforced internal layers, or as internal layer adjacent to a reinforced internal layer.

More preferentially, the tyre of the invention comprises at least one rubber composition as defined above. According to another embodiment, the tyre of the invention comprises at least one reinforced product as defined above or comprises at least one rubber composition as defined above constituting at least one internal layer of the tyre. Preferentially, this internal layer is adjacent to a reinforced product of the tyre.

The internal layer adjacent to a reinforced product of the tyre can be a decoupling rubber, an edge rubber, the bead-wire fillings, and the like.

Of course, the invention relates to the subject-matters described above, namely the rubber composition, the reinforced product and the tyre comprising them, both in the raw state (before to crosslinking) and in the cured state (after crosslinking).

A better understanding of the invention will be obtained on reading the description which will follow, given solely by way of non-limiting example and made with reference to the drawings, in which:

FIG. 1 is a section of a tyre according to the invention comprising an internal layer adjacent to a reinforced product. FIG. 1, without observing a specific scale, diagrammatically represents a radial section of a tyre in accordance with the invention for a vehicle of the passenger vehicle type.

FIG. 2 is a diagrammatic section of an example of a reinforced product according to the invention forming a reinforced ply.

In that which follows, the expressions "radially interior to" and "radially exterior to" or "radially outside" mean respectively "closer to the axis of rotation of the tyre, along the radial direction, than" and "more distant from the axis of rotation of the tyre, along the radial direction, than".

FIG. 1 depicts only a half-view of a tyre which extends symmetrically with respect to the axis XX', which represents the circumferential median plane, or equatorial plane, of the tyre.

In FIG. 1, the tyre 1 comprises a radial carcass reinforcement composed of a single ply 2 of metallic steel cords, said carcass reinforcement being anchored in each bead; said beads are not represented in FIG. 1. The carcass reinforcement is radially, on the outside, surmounted by a crown reinforcement 3 comprising radially, from the inside to the outside:
- a first "triangulation" crown ply 30 formed of metallic steel cords,
- a first working crown ply 31 formed of metallic steel cords, then
- a second working crown ply 32 formed of metallic steel cords which are identical to those of the first working crown ply 31; and
- radially inserted between the ends of the working crown plies 31, 32, an edge rubber P, comprising at least one composition according to the invention and as described above, which extends in part parallel to the ply 2, and a decoupling rubber B comprising at least one composition according to the invention as described above, covering the end of said working ply 30.

In FIG. 2, there has been represented a sectional view of a reinforced product according to the invention, designated by the general reference 33, forming a reinforced ply, in particular a working ply, of the tyre of FIG. 1. The reinforced ply 33 comprises reinforcing elements 34, for example steel monofilaments 35, coated at least in part with a metallic coating and embedded in the rubber composition 36 as described above.

In addition to the subject-matters described above, the invention relates to at least one of the subject-matters described in the following implementations:

1. Rubber composition based on at least one elastomeric matrix comprising at least one diene elastomer, at least one reinforcing filler predominantly comprising carbon black and at least one reinforcing inorganic filler, at least one plasticizing resin having a glass transition temperature of greater than or equal to 20° C., at least one cobalt salt and at least one vulcanization system, said rubber composition exhibiting a Z score for dispersion of the reinforcing filler in the elastomeric matrix of greater than or equal to 85, more preferentially of greater than or equal to 90.

2. Rubber composition according to Implementation 1, in which the carbon black in the rubber composition exhibits a compressed oil absorption number (COAN) of greater than or equal to 60 ml/100 g, preferably a COAN number within a range extending from 65 to 130 ml/100 g.

3. Rubber composition according to either one of Implementations 1 and 2, in which the carbon black exhibits a BET specific surface of greater than or equal to 30 m²/g, preferably of greater than or equal to 60 m²/g, more preferentially still within a range extending from 60 to 150 m²/g.
4. Rubber composition according to any one of the preceding implementations, in which the content of carbon black in the rubber composition is within a range extending from 10 to 80 phr, preferably from 30 to 70 phr, more preferentially still from 35 to 65 phr.
5. Rubber composition according to any one of the preceding implementations, in which the content of reinforcing inorganic filler of the rubber composition is less than or equal to 50 phr, preferably is within a range extending from 0.5 phr to 50 phr, more preferentially still is within a range extending from 2 to 40 phr, more preferentially still from 4 to 25 phr.
6. Rubber composition according to Implementation 4 to 5, in which the content of carbon black is within a range extending from 30 to 70 phr and the content of the reinforcing inorganic filler is within a range extending from 2 to 40 phr.
7. Rubber composition according to Implementation 4 to 5, in which the content of carbon black is within a range extending from 30 to 70 phr and the content of the reinforcing inorganic filler is within a range extending from 4 to 25 phr.
8. Rubber composition according to Implementation 4 to 5, in which the content of carbon black is within a range extending from 35 to 65 phr and the content of the reinforcing inorganic filler is within a range extending from 2 to 40 phr.
9. Rubber composition according to Implementation 4 to 5, in which the content of carbon black is within a range extending from 35 to 65 phr and the content of the reinforcing inorganic filler is within a range extending from 4 to 25 phr.
10. Rubber composition according to any one of the preceding implementations, in which the content of total reinforcing filler (carbon black and reinforcing inorganic filler) is within a range extending from 20 to 130 phr, more preferentially is within a range extending from 30 to 120 phr, more preferentially still within a range extending from 30 to 95 phr.
11. Rubber composition according to any one of the preceding implementations, in which the reinforcing inorganic filler of the rubber composition comprises a silica, more preferentially consists of silica.
12. Rubber composition according to any one of the preceding implementations, in which the plasticizing resin is selected from the group consisting of aliphatic resins, aromatic resins, resins of aliphatic/aromatic type and the mixtures of these plasticizing resins.
13. Rubber composition according to Implementation 12, in which the plasticizing resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ cut homopolymer or copolymer resins, $C_9$ cut homopolymer or copolymer resins, α-methylstyrene homopolymer and copolymer resins and the mixtures of these resins.
14. Rubber composition according to Implementation 13, in which the plasticizing resin is selected from the group consisting of cyclopentadiene or dicyclopentadiene homopolymer or copolymer resins, $C_5$ cut homopolymer or copolymer resins, $C_9$ cut homopolymer or copolymer resins and the mixtures of these resins.
15. Rubber composition according to Implementation 14, in which the plasticizing resin is chosen a $C_5$ cut/vinylaromatic copolymer resin.
16. Rubber composition according to any one of the preceding implementations, in which the plasticizing resin has a number-average molecular weight of between 300 and 2000 g/mol and a polydispersity index of less than 2.
17. Rubber composition according to any one of the preceding implementations, in which the content of plasticizing resin in the rubber composition is within a range extending from 0.5 to 20 phr, preferably from 2 to 12 phr, more preferentially still from 3 to 10 phr.
18. Rubber composition according to any one of the preceding implementations, in which the rubber composition is obtained from a masterbatch of said diene elastomer and of said carbon black.
19. Rubber composition according to Implementation 18, in which said minor reinforcing inorganic filler, said plasticizing resin having a Tg of greater than or equal to 20° C. and said cobalt salt are incorporated in the diene elastomer/carbon black masterbatch, preferably in the internal mixer.
20. Rubber composition according to Implementation 18 or 19, in which the masterbatch is obtained by liquid-phase compounding starting from a diene elastomer latex and from an aqueous dispersion of carbon black.
21. Rubber composition according to Implementation 20, in which the diene elastomer latex is selected from the group consisting of a natural field rubber latex, a concentrated natural rubber latex, an epoxidized natural rubber latex and a deproteinized natural rubber latex.
22. Rubber composition according to Implementation 21, in which the diene elastomer latex is selected from the group consisting of a polybutadiene latex, a butadiene copolymer latex, a synthetic isoprene copolymer latex and a mixture of these latices.
23. Rubber composition according to any one of Implementations 18 to 22, in which the masterbatch is obtained according to the following process stages:
feeding a continuous stream of a diene elastomer latex to a mixing region of a coagulation reactor defining an elongated coagulation region extending between the mixing region and an outlet,
feeding a continuous stream of a fluid comprising a filler under pressure to the mixing region of a coagulation reactor in order to form a coagulated mixture,
drying the coagulated mixture obtained above in order to recover the masterbatch.
24. Rubber composition according to any one of the preceding implementations, in which the cobalt salt is selected from the group consisting of cobalt abietates, cobalt acetylacetonates, cobalt tallates, cobalt naphthenates, cobalt resinates and the mixtures of these cobalt salts.
25. Rubber composition according to any one of the preceding implementations, in which the content of cobalt salt is within a range extending from 0.1 phr to 6 phr, preferably extending from 0.5 phr to 5 phr, more preferentially still extending from 0.6 phr to 3 phr.
26. Rubber composition according to any one of the preceding implementations, in which the content of sulfur is within a range extending from 0.5 to 7 phr, more preferentially is within a range extending from 0.75 to 5.5 phr.

27. Reinforced product comprising at least one steel reinforcing element coated at least in part with a metallic coating and at least one rubber composition as defined in any one of Implementations 1 to 26, said reinforcing element being embedded in said rubber composition.

28. Reinforced product according to Implementation 27, in which the metal of the metallic coating of the reinforcing element is chosen from zinc, copper, tin, cobalt and the alloys of these metals.

29. Reinforced product according to Implementation 27, in which the metal of the metallic coating of the reinforcing element is an alloy chosen from brass or bronze; preferably, the alloy is brass.

30. Reinforced product according to any one of Implementations 27 to 29, selected from the group consisting of carcass plies, protective crown plies, working crown plies and hooping crown plies.

31. Tyre comprising at least one rubber composition as defined in any one of Implementations 1 to 26.

32. Tyre according to Implementation 31, in which the rubber composition is an internal layer adjacent to at least one reinforced product; preferably, said rubber composition is an edge rubber or a decoupling rubber.

33. Tyre comprising at least one reinforced product as defined in any one of Implementations 27 to 32.

5. EXAMPLES

5.1 Measurement of the Z Score

In a known way, the dispersion of filler in an elastomeric matrix can be represented by the Z score, which is measured, after crosslinking, according to the method described by S. Otto et al. in Kautschuk Gummi Kunststoffe, 58 Jahrgang, NR 7-8/2005, in agreement with Standard ISO 11345-2006.

The calculation of the Z score is based on the percentage of surface area in which the filler is not dispersed ("% undispersed surface area"), as measured by the "disperGRADER+" device supplied, with its operating procedure and its "disperDATA" operating software, by Dynisco, according to the equation:

$$Z=100-(\% \text{ undispersed surface area})/0.35$$

The percentage of undispersed surface area is, for its part, measured by virtue of a camera which observes the surface of the sample under incident light at 30°. The light points are associated with filler and with agglomerates, while the dark points are associated with the rubber matrix; digital processing converts the image into a black and white image and makes possible the determination of the percentage of undispersed surface area, as described by S. Otto in the abovementioned document.

The higher the Z score, the better the dispersion of the filler in the elastomeric matrix (a Z score of 100 corresponding to a perfect dispersion and a Z score of 0 to a mediocre dispersion). A Z score of greater than or equal to 80 will be regarded as corresponding to a surface exhibiting a very good dispersion of the filler in the elastomeric matrix.

5.2 Measurement of the Breaking Energy.

The breaking energy is measured at 100° C. on a test specimen stretched at 500 mm/min in order to bring about the breakage of a tensile test specimen. This test specimen is composed of a rubber plaque of parallelepipedal shape with dimensions of 10×145×2.5 mm in which 3 notches with a length of 3 mm over a depth of 5 mm are made using a razor blade, at mid-height and 6 mm apart parallel to the width of the test specimen, before the start of the test. The force (N/mm) to be exerted in order to obtain breaking (FRD in N/mm) is determined and the strain at break is measured (DRD, in %). Thus, the energy for bringing about breaking (breaking energy) of the test specimen, which is the product of the FRD and DRD, can be determined. The breaking energy is a descriptor of the cohesion of the material. The higher the value of the breaking energy, the better the cohesion of the rubber composition. For greater readability, the results will be shown in base 100, the value 100 being arbitrarily assigned to the control. A result of less than 100 indicates a decrease in the cohesive performance of the mixture and, conversely, a result of greater than 100 indicates an increase in this performance.

5.3 Dynamic Properties.

The dynamic properties and in particular $\tan(\delta)max$ are measured on a viscosity analyser (Metravib VA4000) according to Standard ASTM D 5992-96. The response of a sample of vulcanized composition (cylindrical test specimen with a thickness of 2.8 mm and with a cross section of 400 $mm^2$), subjected to a simple alternating sinusoidal shear stress, at a frequency of 10 Hz and at a temperature of 100° C., is recorded. A strain amplitude sweep is carried out from 0.1% to 100% peak-to-peak (outward cycle) and then from 100% to 0.1% peak-to-peak (return cycle). The results made use of are the loss factor ($\tan \delta$). For the return cycle, the maximum value of $\tan(\delta)$ observed, denoted $\tan(\delta)_{max\ at\ 100°\ C.}$, is indicated.

The $\tan(\delta)_{max\ at\ 100°\ C.}$ results are shown in base 100 and are obtained as follows: the $\tan(\delta)_{max\ at\ 100°\ C.}$ result obtained for a test sample is calculated in base 100 by assigning the arbitrary value 100 to the control: $\text{Tan}(\delta)_{max\ at\ 100°\ C.}$ result (base 100)=($\tan(\delta)_{max\ at\ 100°\ C.}$ value of the test sample× 100)/($\tan(\delta)_{max\ at\ 100°\ C.}$ value of the control). In this way, a result of less than 100 indicates a decrease in the hysteresis (which is favourable to the rolling resistance).

5.4 Test of Resistance to Crack Propagation

The rate of cracking (VP) was measured on test specimens of rubber compositions using a cyclic fatigue device (Elastomer Test System) of the 381 type from MTS, as explained below.

The resistance to cracking is measured using repeated tensile actions on a test specimen initially accommodated (after a first tensile cycle) and then notched. The tensile test specimen is composed of a rubber plaque of parallelepipedal shape, with a thickness of between 1 and 2 mm, with a length between 130 and 170 mm and with a width between 10 and 15 mm, the two side edges each being covered in the direction of the length with a cylindrical rubber bead (diameter 5 mm) making possible anchoring in the jaws of the tensile testing device. The test specimens thus prepared are tested in the fresh state. The test was carried out under nitrogen, at a temperature of 100° C. After accommodations, 3 very fine notches with lengths of between 15 and 20 mm are produced using a razor blade, at mid-width and aligned in the direction of the length of the test specimen, one at each end and one at the centre of the test specimen, before starting the test. At each tensile cycle, the degree of strain of the test specimen is automatically adjusted so as to keep the energy restitution level (amount of energy released during the progression of the crack) constant at a value of less than or equal to 3000 $J/m^2$. The rate of the crack propagation is measured in nanometres per cycle. The resistance to crack propagation will be expressed in relative units (r.u.) by dividing the propagation rate of the control by that of the sample to be analysed, the rates being measured at the same energy restitution level. A value lower than that of the control, arbitrarily set at 100, indicates an improved result, that is to say an improved resistance to the propagation of the crack.

5.5. Adhesion Test

The quality of the bonding between the rubber composition and the reinforcing elements is assessed by an adhesion test in which the force required to extract these reinforcing elements from a vulcanized rubber composition is measured using adhesion test specimens.

In order to manufacture the adhesion test specimens, 15 identical reinforcing elements are used, the reinforcing element being a cord formed by 11 steel threads with a diameter of 35 mm which are coated with brass. A rubber block is prepared which is composed of two raw plaques, with dimensions of 200 mm by 12.5 mm and with a thickness of 7 mm, applied against each other before curing (the thickness of the resulting block is then 14 mm). The two plaques of the rubber block consist of the same rubber composition. It is during the preparation of the block that the reinforcing elements (15 in total) are trapped between the two plaques of the rubber block in the raw state, an equal distance apart and while leaving to protrude, on either side of these plaques, an end of the reinforcing element having a length sufficient for the subsequent tensile test. The block comprising the reinforcing elements is placed in a suitable mould and then cured at 110° C. for 480 min under a pressure of 15 bars (plate clamping force=30 kN). On conclusion of the curing, the test specimen, thus consisting of the vulcanized block and of the 15 steel threads, is placed between the jaws of a tensile testing machine (Intron Series 5000) in order to make it possible to test each steel thread at a rate of 100 mm/min and at a temperature of 23° C.

The adhesion levels are characterized by measuring the "tearing-out" force in N/mm² (denoted by $F_{max}$) for tearing the reinforcing elements out of the test specimen. A value greater than that for the control test specimen, arbitrarily set at 100, indicates an improved result, that is to say, a greater tearing-out force than that for the control test specimen.

5.6: Test

The aim of this example is to demonstrate the improvement in the compromise in rolling resistance/cohesion/resistance to the rate of cracking/adhesion properties of a rubber composition used in a reinforced product according to the invention, in comparison with rubber compositions used in control reinforced products.

For this, the following five rubber compositions are prepared:

- the control composition C1 is a composition conventionally used and sold for coating steel reinforcing elements. It thus represents a compromise in rolling resistance/cohesion/resistance to the rate of cracking/adhesion performance for reinforcing elements and reinforced products on the market; it is based on natural rubber, on carbon black, on a cobalt salt and on sulfur. It is prepared by bulk compounding;
- the composition C2, not in accordance with the invention, differs from the composition C1 in that it additionally comprises a reinforcing inorganic filler and a plasticizing resin having a glass transition temperature of greater than 20° C.;
- the composition C3, not in accordance with the invention, differs from the composition C1 in that it is produced from a masterbatch obtained by liquid compounding;
- the composition C4, not in accordance with the invention, differs from the composition C3 in that it additionally comprises a plasticizing resin having a glass transition temperature of greater than 20° C.;
- the composition C5, not in accordance with the invention, differs from the composition C3 in that it additionally comprises a reinforcing inorganic filler;
- the composition I1, in accordance with the invention, differs from the composition C3 in that it additionally comprises a reinforcing inorganic filler and a plasticizing resin having a glass transition temperature of greater than 20° C.

The formulation of these compositions is given in Table 1; the contents of the various products are expressed in phr (parts by weight per hundred parts by weight of elastomer).

TABLE 1

| Compositions | C1 | C2 | C3 | C4 | C5 | I1 |
| --- | --- | --- | --- | --- | --- | --- |
| Elastomer (1) | 100 | 100 | (—) | (—) | (—) | (—) |
| Carbon black (2) | 50 | 50 | (—) | (—) | (—) | (—) |
| Masterbatch (3) | (—) | (—) | 150 | 150 | 150 | 150 |
| Reinforcing inorganic filler (4) | (—) | 6 | (—) | (—) | 6 | 6 |
| Coupling agent (5) | (—) | 0.85 | (—) | (—) | 0.85 | 0.85 |
| Plasticizing resin (6) | (—) | 6 | (—) | 6 | (—) | 6 |
| Antioxidant | 2 | 2 | 2 | 2 | 2 | 2 |
| Zinc oxide (7) | 7.5 | 7.5 | 7.5 | 7.5 | 7.5 | 7.5 |
| Stearic acid (8) | 0.9 | 0.9 | 0.9 | 0.9 | 0.9 | 0.9 |
| Sulfur | 5 | 5 | 5 | 5 | 5 | 5 |
| Accelerator (9) | 0.6 | 0.6 | 0.6 | 0.6 | 0.6 | 0.6 |
| Cobalt salt (10) | 1.12 | 1.12 | 1.12 | 1.12 | 1.12 | 1.12 |

(1): Natural rubber;

(2): Carbon black of ASTM N347 grade (Cabot) with a BET specific surface equal to 90 m²/g and with a COAN number of 100 g/100 ml; the BET specific surface and the COAN number are measured according to the methods described above;

(3): Masterbatch: 100 phr of natural rubber and 50 phr of carbon black of ASTM N347 grade (Cabot); the masterbatch is obtained by liquid-phase compounding according to the process described in the document U.S. Pat. No. 6,929,783 and below and starting from a natural rubber latex and from an aqueous dispersion of said carbon black;

(4): Silica, Zeosil 1165MP, sold by Solvay; the BET specific surface, measured according to the method described in the description, of this silica is equal to 160 m²/g;

(5): Bis[3-(triethoxysilyl)propyl] tetrasulfide silane (TESPT), sold by Evonik under the reference Si69;

(6): Plasticizing resin: $C_5/C_9$ cut sold by Exxon Mobil under the reference Escorez 2173, of which Tg = 40° C., measured according to the method described above, the softening point, measured according to Standard ASTM D3461-2014, is 90° C., Mn = 940 g/mol and PI = 1.7, which are measured according to the method described above;

(7): Zinc oxide of industrial grade - Umicore;

(8): Stearin, Pristerene 4931 from Uniqema;

(9): N-(tert-Butyl)-2-benzothiazolesulfenamide (Santocure TBBS from Flexsys);

(10): Cobalt naphthenate, Product No. 60630 from Fluka.

Manufacture of the Compositions
Composition C1 and C2:

For the manufacture of the compositions C1 and C2, the procedure is as follows: the reinforcing filler (carbon black) and optionally the reinforcing inorganic filler, when it is present, the natural rubber, as well as the various other ingredients, such as the plasticizing resin, when it is present, with the exception of the crosslinking system, are successively introduced into an internal mixer, the initial vessel temperature of which is approximately 50° C.; the mixer is thus filled to approximately 70% by volume. Thermomechanical working (non-productive phase) is then carried out in a stage of approximately 3 to 5 min, until a maximum "dropping" temperature of 160° C. is reached. The mixture thus obtained is recovered, it is cooled and then the sulfur and the vulcanization accelerator are incorporated on an external mixer (homofinisher) at 40° C., everything being mixed (productive phase) for a few minutes.

Compositions C3 to C5 and I1

For the compositions C3 to C5 and I1, first of all the masterbatch is manufactured in the following way according to the process described in the document U.S. Pat. No. 6,929,783. More particularly, an aqueous dispersion of carbon black N347 at a concentration by weight of 14.5% is injected at a flow rate of 2512 kg/h into the mixing region of a coagulation reactor, which mixing region is as described in the document U.S. Pat. No. 6,929,783, where it is mixed with the natural rubber latex, which is a field latex having a concentration by weight of 28% and which arrives at a flow rate of 2580 kg/h in said mixing region. The two dispersions coagulate in this device and form a coagulum. The coagulum obtained is subsequently drained, dried and masticated according to the process described in Patent U.S. Pat. No. 6,929,783 and the elastomer/carbon black masterbatch is obtained which contains 100 phr of natural rubber and 50 phr of carbon black N347.

Subsequently, the masterbatch obtained in the preceding stage, if appropriate the plasticizing resin and/or the minor reinforcing inorganic filler, as well as the various other ingredients, with the exception of the crosslinking system, are successively introduced into a Banbury-type internal mixer (final degree of filling: approximately 70% by volume), the initial vessel temperature of which is approximately 50° C.; the mixer is thus filled to approximately 70% by volume. Thermomechanical working (non-productive phase) is then carried out in a stage of approximately 3 to 5 min, until a maximum "dropping" temperature of 160° C. is reached.

The mixture thus obtained is recovered, it is cooled and then the crosslinking system is incorporated on an external mixer (homofinisher) at 30° C., everything being mixed (productive phase) for a few minutes.

Rubber Properties

The compositions C1 to C5 and I1 thus obtained are subsequently calendered, either in the form of plaques (thickness of 2 to 3 mm) or of thin sheets of rubber, for the measurement of their physical or mechanical properties, or extruded in the form of a profiled element. For the manufacture of the reinforced products, the process is carried out in a way well known to a person skilled in the art, by calendering the metal reinforcers between two layers of rubber composition in the raw (non-vulcanized) state, each having a thickness desired for the manufacture of the test specimens (see above).

For the measurements of breaking energy, the dynamic properties and the resistance to crack propagation, the samples thus produced were cured at 115° C. for 360 min in a bell press.

The properties of these different compositions and of the reinforced products were evaluated and are presented in Table 2 below.

TABLE 2

| Compositions | C1 | C2 | C3 | C4 | C5 | I1 |
|---|---|---|---|---|---|---|
| Z score | 87 | 78 | 94 | 95 | 90 | 92 |
| Tan(δ)max at 100° C. (base 100) | 100 | 103 | 78 | 74 | 92 | 91 |
| Breaking energy at 100° C. (base 100) | 100 | 268 | 100 | 191 | 163 | 215 |
| Resistance to the rate of cracking (base 100) | 100 | 81 | 97 | 94 | 80 | 38 |
| Adhesion test on the reinforced product | | | | | | |
| Fmax at 20° C. after cooling after the curing (base 100) | 100 | 91 | 81 | 93 | 72 | 100 |

It is observed, from Table 2, that, when a reinforcing inorganic filler and a plasticizing resin are added to the control composition C1 in order to obtain the composition C2 which is not in accordance, the rolling resistance/cohesion/resistance to the rate of cracking/adhesion compromise is not improved (comparison compositions C1 and C2). This is because, although the breaking energy and the resistance to the rate of cracking are significantly improved, these improvements take place to the detriment of the hysteresis $(Tan(\delta)_{max\ at\ 100°\ C.})$ (thus of the rolling resistance) and of the adhesion properties ($F_{max}$ decreased).

When the natural rubber, in the latex form, and the carbon black, in the form of an aqueous dispersion, are mixed by liquid-route compounding in order to obtain the composition C3, it is observed, by comparison with the composition C1, that neither the cohesion of the rubber composition (breaking energy) nor the adhesion of the composition to the steel reinforcing elements was improved. The compromise in properties is thus not achieved.

When a plasticizing resin is added to the composition not in accordance with the invention C3 in order to obtain the composition not in accordance with the invention C4, an improvement in the hysteresis, in the cohesion of the composition, as well as in the resistance to the rate of cracking of the composition C4, with respect to the composition C3, is observed, as well as a slight improvement in the adhesion properties, but without, however, achieving for this property the values of the control composition C1. The compromise in properties is thus also not achieved for the composition C4.

When a silica is added to the composition not in accordance with the invention C3 in order to obtain the composition not in accordance with the invention C5, an improvement in the cohesion of the composition C5, with respect to the cohesion of the composition C3, is observed, as well as an improvement in the resistance to the rate of cracking, with respect to the composition C3 but also with respect to the composition C1. On the other hand, a significant decrease in the adhesion properties of the composition C5 is observed. The property compromise is thus also not achieved for the composition C5.

Surprisingly, when a silica and a high Tg plasticizing resin are added to the composition C3 in order to obtain the composition I1 according to the invention, a significant improvement in the properties of cohesion, of resistance to the rate of cracking and of adhesion is observed, with respect to the control composition C3 but also with respect to the compositions C4 and C5 which are not in accordance. The composition I1 according to the invention also exhibits properties of hysteresis, of cohesion and of resistance to the rate of cracking which are significantly improved, with respect to the control composition C1, while keeping the adhesion properties equivalent to those of the composition C1. The compromise in rolling/cohesion/resistance to the rate of cracking/adhesion properties is thus improved for the composition I1 according to the invention. Surprisingly, the composition I1 according to the invention exhibits the best properties of resistance to cracking of all the compositions C1 to C5 not in accordance tested.

The invention claimed is:

1. A rubber composition based on:
   an elastomeric matrix consisting of one or more diene elastomers each selected from the group consisting of natural rubber, synthetic polyisoprenes, and mixtures thereof;
   at least one reinforcing filler predominantly comprising carbon black and at least one reinforcing inorganic filler;
   at least one plasticizing resin having a glass transition temperature of greater than or equal to 20° C.;
   at least one cobalt salt; and
   at least one vulcanization system,
   wherein the rubber composition exhibits a Z score for dispersion of the at least one reinforcing filler in the elastomeric matrix of greater than or equal to 85,
   wherein the rubber composition is obtained from a masterbatch of the elastomeric matrix and of the carbon black,
   wherein the carbon black exhibits a BET specific surface of greater than 60 m²/g,
   wherein the reinforcing inorganic filler comprises a silica,
   wherein a content of the reinforcing inorganic filler is between from 2 to 40 phr,
   wherein a content of the plasticizing resin is from 3 to 10 phr, and
   wherein a content of the cobalt salt is from 0.1 to 6 phr.

2. The rubber composition according to claim 1, wherein the carbon black exhibits a compressed oil absorption number of greater than or equal to 60 ml/100 g.

3. The rubber composition according to claim 1, wherein a content of carbon black is within a range extending from 10 to 80 phr.

4. The rubber composition according to claim 1, wherein the at least one plasticizing resin is selected from the group consisting of aliphatic resins, aromatic resins, resins of aliphatic/aromatic type, and mixtures thereof.

5. The rubber composition according to claim 1, wherein the masterbatch is obtained by liquid-phase compounding starting from a diene elastomer latex and from an aqueous dispersion of carbon black.

6. The rubber composition according to claim 5, wherein the masterbatch is obtained by a process comprising:
   feeding a continuous stream of the diene elastomer latex to a mixing region of a coagulation reactor defining an elongated coagulation region extending between the mixing region and an outlet;
   feeding a continuous stream of the aqueous dispersion of carbon black under pressure to the mixing region of the coagulation reactor in order to form a coagulated mixture; and
   drying the coagulated mixture obtained above in order to recover the masterbatch.

7. A reinforced product comprising at least one steel reinforcing element coated at least in part with a metallic coating and the rubber composition according to claim 1, the reinforcing element being embedded in the rubber composition.

8. The reinforced product according to claim 7, wherein the metal of the metallic coating of the reinforcing element is selected from the group consisting of zinc, copper, tin, cobalt and alloys thereof.

9. A tire comprising at least one reinforced product according to claim 7.

10. A tire comprising at least one rubber composition according to claim 1.

* * * * *